United States Patent [19]

Yamazawa et al.

[11] Patent Number: 4,798,101
[45] Date of Patent: Jan. 17, 1989

[54] CORE MATERIAL FOR STEERING WHEELS MADE OF LONG FIBER-REINFORCED RESIN

[75] Inventors: Yasushi Yamazawa; Masaki Terada; Yasuhiro Tsuchiya, all of Susono, Japan

[73] Assignee: Toyota Jidosha Kabushiki Kaisha, Japan

[21] Appl. No.: 8,255

[22] Filed: Jan. 29, 1987

[30] Foreign Application Priority Data

Jan. 30, 1986 [JP] Japan .............................. 61-11963[U]

[51] Int. Cl.$^4$ ............................................. B62D 1/04
[52] U.S. Cl. ....................................................... 74/552
[58] Field of Search .......................................... 74/552

[56] References Cited

U.S. PATENT DOCUMENTS

| D. 138,079 | 6/1944 | Drew | 74/552 X |
|---|---|---|---|
| 3,321,996 | 5/1967 | Cardinale | 74/552 |
| 3,555,925 | 1/1971 | Bowser | 74/552 |
| 3,583,255 | 6/1971 | Curcuru | 74/552 |
| 3,800,604 | 4/1974 | Barenyi | 74/552 |
| 4,047,450 | 9/1977 | Lecart et al. | 74/552 |
| 4,419,908 | 12/1983 | Reikowski | 74/552 |
| 4,673,451 | 6/1987 | Yamazawa et al. | 74/552 X |
| 4,681,647 | 7/1987 | Kondo et al. | 74/552 X |
| 4,749,422 | 6/1988 | Kondo et al. | 156/166 |

FOREIGN PATENT DOCUMENTS

| 50309 | 4/1982 | European Pat. Off. | 74/552 |
|---|---|---|---|
| 146959 | 7/1985 | European Pat. Off. | 74/552 |
| 173143 | 3/1986 | European Pat. Off. | 264/257 |
| 789716 | 11/1935 | France | 74/552 |
| 2506246 | 11/1982 | France | 74/552 |
| 55-91453 | 7/1980 | Japan | 74/552 |
| 60-76722 | 5/1985 | Japan . | |
| 61-6067 | 1/1986 | Japan | 74/552 |
| 2004835A | 4/1979 | United Kingdom . | |
| 2041858A | 9/1980 | United Kingdom | 74/552 |
| 1582846 | 1/1981 | United Kingdom | 74/552 |

*Primary Examiner*—Gary L. Smith
*Assistant Examiner*—Rodney M. Lindsey
*Attorney, Agent, or Firm*—Finnegan, Henderson, Farabow, Garrett & Dunner

[57] ABSTRACT

A core for a steering wheel made of a long fiber-reinforced resin in which a ring portion, a boss portion and a three spoke portions including a first spoke portion, a second spoke portion and a third spoke portion extending in a generally T-shaped configuration from the ring portion to the boss portion, are formed by bundles of continuous fibers reinforced with a resin. The cross-sectional area for the second spoke portion situated between the first spoke portion and the third spoke portion is made smaller than the cross-sectional area for the first spoke portion and the third spoke portion.

9 Claims, 2 Drawing Sheets

DIVERGING ANGLE

CORE MATERIAL FOR STEERING WHEELS MADE OF LONG FIBER-REINFORCED RESIN

RELATED APPLICATIONS

U.S. patent application Ser. No. 745,931, filed June 18, 1985 now U.S. Pat. No. 4,681,647, U.S. patent application Ser. No. 749,447 now U.S. Pat. No. 4,749,422, filed June 27, 1985, and U.S. patent application Ser. No. 756,319, filed July 18, 1985, now U.S. Pat. No. 4,673,451, contain subject matter which is related to the invention of this application.

BACKGROUND OF THE INVENTION

1. Field of the Invention

This invention concerns core material for steering wheels made of long fiber-reinforced resin used as the steering wheels for vehicles such as automobiles.

2. Description of the Related Art

Recently, a method of manufacturing structural members of excellent strength has been developed as described in British Patent Publication No. GB2004835A by winding, around a frame or the like, bundles of resin-impregnated fibers. These fibers are prepared by impregnating continuous fibers, such as glass fibers or carbon fibers, with a resin such as polyester resin. Steering wheels of reduced weight and excellent strength have been provided by making the core for steering wheels by this manufacturing method.

Various devices in the steering mechanisms of automobiles have been adopted for driver safety in recent years. For example, a collapsible steering mechanism for absorbing shocks upon collision of a car in which a tube or the like that absorbs energy while being collapsed upon collision may be disposed in a steering column.

There have also been made various steering wheel configurations for protecting driver's chest from hitting against the boss portion of the steering wheel, these configurations being based on the results of tests for shock load when the shape of the steering wheel is varied. A core 15 for a steering wheel of the T-shaped 3-spoke type, for example, as shown in FIGS. 8 and 9, which comprises a ring portion 12, a boss portion 13, as well as a first spoke portion 14a, a second spoke portion 14b and a third spoke portion 14c, extended in a T-like configuration has frequently been used. The diverging angle $\theta$ between the first spoke portion 14a and the third spoke portion 14c (hereinafter simply referred to as the diverging angle) is made greater than 170°.

The safeguarding of life in car accidents is a most important problem, and it is desired that operators do not suffer from injuries during even the most severe collision accidents.

Accordingly, various modifications have been made in core 15 for T-shaped 3-spoke type steering wheels in order to improve safety characteristics as described above.

SUMMARY OF THE INVENTION

It is an object of this invention to improve the safety characteristics of the aforedescribed T-shaped, 3-spoke type steering wheels.

It is a further object of the invention to provide a steering wheel core made of long fiber-reinforced resin in which the shape for the first spoke portion, the second spoke portion and the third spoke portion are in a columnar shape in a steering wheel core of a T-shaped, 3-spoke type, whereby the steering wheel is deformed to a position parallel with a driver upon a car collision to improve the energy absorption upon collision thereby improving the driver's safety.

Additional objects and advantages of the present invention will be set forth in part in the description that follows and in part will be obvious from the description or may be learned by practice of the invention. The objects and advantages of the invention may be realized and obtained by the apparatus particularly pointed out in the appended claims.

To achieve the objects and in accordance with the purpose of the present invention, as embodied and broadly described herein, the steering wheel core of this invention comprises a boss portion adapted to be connected to the upper end of a steering column; a ring portion spaced upwardly from the upper end of the boss portion and steering column, the boss portion being centrally disposed relative to the ring portion; first, second and third radial spoke portions extending at respective projection angles to the axis of the boss portion and the ring portion and connecting the boss portion to the ring portion, the first and third spoke portions being angularly spaced from each other at a selected radial angle, the second spoke portion being spaced at a radial angle intermediate the first and third spoke portions, the first, second and third spoke portions including resin reenforced fibers wound to form each spoke portion to have a selectd cross-sectional area, the selected cross-sectional area of the second spoke portion having a maximum cross-sectional area less than a minimum cross-sectional area of the first and third spoke portions for causing the second spoke portion to deform in a direction to change the projection angle between the second spoke portion and the axis of the boss and ring portions more readily than the projection angles between the first and third spoke portions and the axis of the boss and ring portions in response to downward pressure on a section of the ring portion substantially central of the first and third spoke portions.

The core for steering wheels has a ring portion, a boss portion situated at the axial center of the ring portion, and three spoke portions, i.e., a first spoke portion, a second spoke portion and a third spoke portion, extending in a T-like configuration from the ring portion to the boss portion. The boss, ring and spoke portions are formed with bundles of continuous fibers reinforced with a resin, and the cross-sectional diameter of the second spoke portion situated between the first spoke portion and the third spoke portion is made smaller than the cross-sectional diameter for the first spoke portion and the third spoke portion.

While there is no particular angular restriction upon the diverging angle $\theta$, a diverging angle of from 170° to 180° for the steering wheel core is preferred in this invention.

The accompanying drawings, which are incorporated in and constitute a part of this specification, illustrate the presently preferred embodiment of the invention, and together with the description, serve to explain the principles of the invention.

PREFERRED EMBODIMENTS OF THE INVENTION

Figure 1:
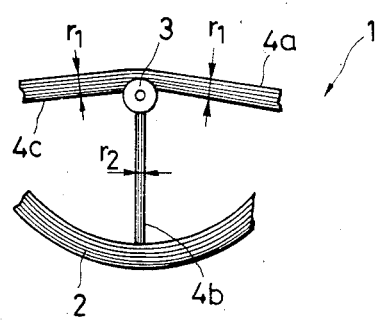
FIG. 1 is a front elevational view showing a portion of a steering wheel core made of long fiber-reinforced resin according to a preferred embodiment of the invention.

A preferred embodiment of the invention will now be described with reference to FIGS. 1-7 of the drawings. Throughout FIGS. 1-7, like reference characters are used to designate like elements.

Figure 2:
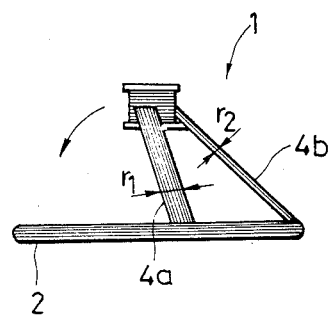
FIG. 2 is a side elevational view showing a steering wheel core made of long fiber-reinforced resin according to a preferred embodiment of the invention.
Figure 3:
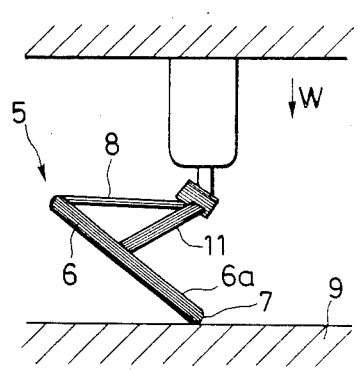
FIG. 3 is a side view, illustrating the nondeformed state of the steering wheel in a test example.

In FIG. 1 a steering wheel core made of a long fiber-reinforced resin is shown. Core 1 of this embodiment includes ring portion 2, boss portion 3, and three spoke portions namely first spoke portion 4a, second spoke portion 4b, and third spoke portion 4c extended from the ring portion 2 to the boss portion 3 in a T-shaped configuration. Ring portion 2, boss portion 3 and spoke portions 4a-4c are formed by repeatingly winding bundles of continuous fibers such as carbon fibers and glass fibers reinforced with resin as shown in FIGS. 1 and 2. In core 1, each first spoke portion 4a and third spoke portion 4c is in a circular form having a diameter $r_1$, while second spoke portion 4b is in a similar circular shape having a diameter $r_2$ that is smaller than diameter $r_1$ of the spoke portions 4a and 4c.

A method of manufacturing the core 1 for the steering wheel will now be described.

First, bundles of continuous long fibers, such as glass fibers are immersed in a solution of a resin such as an epoxy resin or polyester resin to impregnate the bundles of fibers with the resin. Then, the resin-impregnated fiber bundles are wound repeatedly around a predetermined metal member (including boss metal member) to form ring portion 2, boss portion 3, and the three spoke portions, namely first spoke portion 4a, second spoke portion 4b and third spoke portion 4c. The diameter of second spoke portion 4b is formed smaller by decreasing the number of fiber bundles for the second spoke portion 4b as compared with that for the first and the third spoke portions 4a and 4c. The resin is thus finally heated and cooled to cure.

TEST EXAMPLE 1

A test was conducted to determine the characteristics of deformation upon a collision of a steering wheel 5 (see FIGS. 3 and 4) manufactured by coating a polyurethane resin over the steering wheel core 1 made of long fiber-reinforced resin as in the embodiment described above. The test was conducted by suspending steering wheel 5 while placing ring portion 6 downward at a slant such that a central portion 7 of a first portion 6a of ring 6 (the ring portion on the side opposite wheel spoke portion 8) is situated at the lowermost end of ring 6, applying a load in the vertical direction (shown by arrow W in the drawing) and then gradually urging wheel 5 toward surface 9. This test examined the case where a load is exerted on first ring portion 6a of steering wheel 5, the portion where deformation for absorbing shock energy is least likely to occur in the steering wheel.

Figure 4:
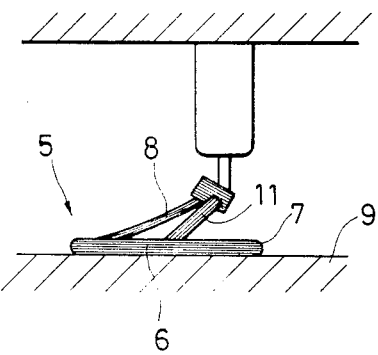
FIG. 4 is a side view illustrating a deformed state of the steering wheel of FIGS. 1 and 2 in the test example of FIG. 3.

In this test, second spoke portion 8 of steering wheel 5 is deformed more readily and greatly than first spoke portion (not shown) and third spoke portion 11. Ring portion 6 is urged parallel with surface 9 as shown in FIG. 4. In this case, no flexions were recognized in ring portion 2, boss portion 3 and three spoke portions (first spoke portion 4a, second spoke portion 4b and third spoke portion 4c) of the steering wheel core 1.

This test was conducted to examine the deformed state of steering wheel 5 upon a collision accident in a case where wheel 5 is mounted in an automobile. Surface 9 represents a driver and the state of steering wheel 5 shown in FIG. 4 illustrates the deformed state of steering wheel 5 upon collision.

TEST EXAMPLE 2

Figure 8:
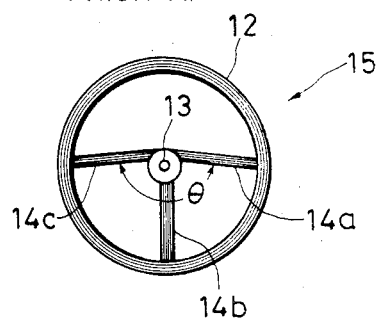
FIG. 8 is a front elevational view of a core of a T-shaped 3-spoke type steering wheel constructed of a core material of a type used in the illustrated embodiments of the invention.
Figure 9:
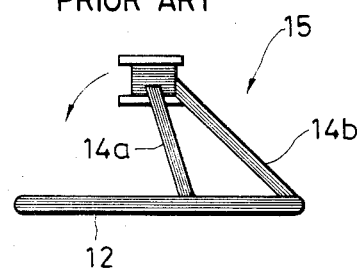
FIG. 9 is a side elevational view of the T-shaped 3-spoke type steering wheel core of FIG. 8.

In this example, the relationship between the diverging angle $\theta$ (see FIG. 8) and the diameter of the second spoke portion of the core of the steering wheel according to this invention was examined.

In the core steering wheel used in this test, the diameter for the first spoke portion and the third spoke portion was 15 mm, the diameter for the ring portion was 360 to 380 mm, and the height of the steering wheel core from the end of the ring portion to the end of the boss portion was from 100 to 120 mm. In this steering wheel core, tests were conducted while varying diverging angle $\theta$ and the diameter for the second spoke portion.

Figure 5:
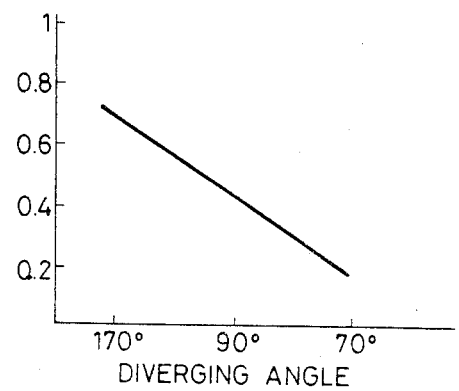
FIG. 5 is a graph showing the relationship between the diverging angle $\theta$ and the diameter ratio between the second spoke core portion and the first spoke core portion in the steering wheel according to this invention.

In the graph shown in FIG. 5, the ordinate represents the ratio of the diameter of the second spoke portion of the core/the diameter of first spoke portion of the core, while the abscissa represents the diverging angle $\theta$.

The steering wheel showing favorable absorption of the collision energy as shown in FIG. 4 had a relationship as shown by the graph in FIG. 5. Thus, the diameter for second spoke portion was about 9.6 mm for diverging angle of 170°.

The diameter for the second spoke portion is made smaller than that of the first spoke portion and the third spoke portion of the steering wheel core according to this invention. However, because the spoke portion is generally coated with skin material made of a polyurethane resin or the like by injection molding of the steering wheel using the core according to this invention, it is possible to make the diameter for the first spoke portion, the second spoke portion and the third spoke portion of the steering wheel identical. It is of course not always necessary that the diameter for the spoke portions of the steering wheel be uniform throughout each entire spoke portion and the diameter may be varied along length of the spoke portion.

In the steering wheel core according to this invention it is desired that sufficient strength be provided to the part of the ring portion that is branched into the first spoke portion 14a or the third spoke portion 14c so that no deflection of these portions results upon collision. For this purpose, there is a method of branching the fibers in a linear-like manner at the branched portions between the ring portion and the spoke portion, for example, as disclosed in Japanese Patent Application No. Sho 60-76722.

Figure 6:
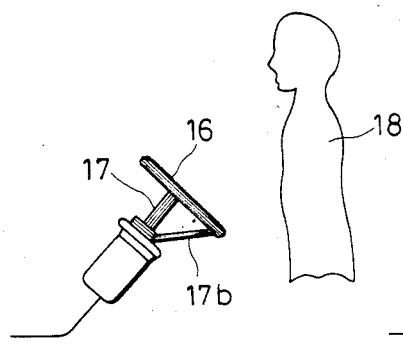
FIG. 6 is a view showing a normal positional relationship between a driver and a steering wheel using a core for the steering wheel according to this invention.
Figure 7:
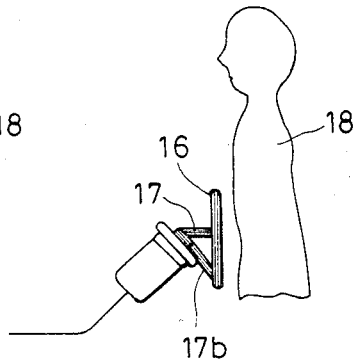
FIG. 7 is a view showing a deformed positional relationship between a driver and a steering wheel using a core for the steering wheel according to this invention upon a collision.

Because the diameter for the second spoke portion is made smaller than that for the first spoke portion and the third spoke portion in this invention, steering wheel 16 which is usually situated at an angle suitable to for steering by a driver 18, as shown in FIG. 6, becomes parallel with driver 18, as shown in FIG. 7, upon collision due to the easy and large deformation of second spoke portion 17b. Accordingly, the impact shock upon collision is effectively absorbed.

In the steering wheel core according to this invention, reduction in fundamental performance, for example in recovering ridgidity of the steering wheel core, can be avoided by making the diameter for the first spoke portion and the third spoke portion identical with or greater than that of a conventional steering wheel. Similarly, by making the diameter for the first spoke portion and the third spoke portion equal to or greater than that in conventional steering wheels, it is possible to avoid performance reduction of the steering wheel core such as in bending rigidity and in vibration characteristics as well as in the above mentioned recovering rigidity.

In the steering wheel core according to this invention, because the diameter for the second spoke portion is made smaller than that of the first spoke portion and the third spoke portion, the forced required to destruct the spoke portion upon collision can be decreased to increase the energy absorbability and further improve the safety.

Particularly, in the steering wheel core according to this invention, excellent energy absorbing effects can be obtained even in a case of a 1R collision in which load is exerted on the side opposite to the second spoke portion, that is, in the case where the least collision energy is absorbable by the T-shaped 3-spoke type steering wheel.

Thus, if the diameter for one or two of the first through third spoke portions in the core of the T-shaped 3-spoke type steering wheel is made smaller than the diameter for the remaining spoke portions, the smaller diameter spoke portion is more readily deformable than other remaining spoke portions, so a construction capable of readily absorbing the collision energy can be obtained.

It will be apparent to those skilled in the art that modifications and variations can be made in the steering wheel core of this invention. The invention in its broader aspects is, therefore, not limited to the specific details, representative methods and apparatus and illustrative examples shown and described above. Thus, it is intended that all matters contained in the foregoing description or shown in the accompanying drawings shall be interpreted as illustrative and not in a limiting sense.

What is claimed is:

1. A steering wheel core, comprising:
   a boss portion adapted to be connected to the upper end of a steering column;
   a ring portion spaced upwardly from the upper end of said boss and steering column, said boss portion being centrally disposed relative to said ring portion;
   first, second and third radial spoke portions extending at respective projection angles to the axis of said boss portion and said ring portion and connecting said boss portion to said ring portion,
   said first and third spoke portions being angularly spaced from each other at a selected radial angle,
   said second spoke portion being spaced at a radial angle intermediate said first and third spoke portions,
   said first, second and third spoke portions including resin reinforced fibers wound to form each said spoke portion to have a selected cross-sectional area,
   said selected cross-sectional area of said resin reinforced fibers of said second spoke portion having a maximum cross-sectional area less than a minimum cross-sectional area of said resin reinforced fibers of said first and third spoke portions for causing said second spoke portion to deform in a direction to change the projection angle between said second spoke portion and the axis of said boss and ring portions more readily than the projection angles between said first and third spoke portions and the axis of said boss and ring portions in response to downward pressure on said ring portion substantially central of said first and third spoke portions.

2. The steering wheel core according to claim 1 wherein the first, second and third spoke portions have a generally circular configuration, each of said spoke portions possessing a selected diameter.

3. The steering wheel core according to claim 2 wherein the diameter of said second spoke portion is a function of the radial angular spacing of the first and third spoke portions.

4. The steering wheel according to claim 1 wherein the reinforced fibers comprise a plurality of bundles, said fiber bundles being wound to provide the first and third spoke portions with the greater cross-sectional area than the second spoke portion.

5. The steering wheel core according to claim 1 wherein the cross-sectional area of said first and third spoke portions are identical.

6. The steering wheel core according to claim 1 wherein the radial angle between said first and third spoke portions is within the range of approximately 70° to 180°.

7. The steering wheel according to claim 6 wherein said radial angle between said first and third spoke portions is within the range of approximately 170° to 180°.

8. The steering wheel according to claim 6 wherein said radial angle between said first and third spoke portions is within the range of approximately 70° to 170°.

9. The steering wheel according to claim 8 wherein the diameters of said first and third spoke portions are approximately 15 mm.

* * * * *